United States Patent [19]

Barker

[11] Patent Number: 5,034,259

[45] Date of Patent: Jul. 23, 1991

[54] PROCESS FOR RE-MANUFACTURING WOOD BOARD AND THE PRODUCT PRODUCED THEREBY

[75] Inventor: Earl M. Barker, Enumclaw, Wash.

[73] Assignee: The Weyerhaeuser Company, Tacoma, Wash.

[21] Appl. No.: 370,162

[22] Filed: Jun. 20, 1989

Related U.S. Application Data

[63] Continuation of Ser. No. 210,735, Jun. 23, 1988, abandoned.

[51] Int. Cl.[5] .............................................. B32B 21/13

[52] U.S. Cl. .................................... 428/106; 144/332; 144/350; 144/351; 428/114; 428/535; 428/537.1

[58] Field of Search ................ 144/330, 332, 350, 351

[56] References Cited

U.S. PATENT DOCUMENTS

| | | | |
|---|---|---|---|
| 149,238 | 3/1874 | Moore . | |
| 301,068 | 6/1884 | Parmelee . | |
| 781,376 | 1/1905 | Sorenson . | |
| 947,001 | 1/1910 | Kertscher . | |
| 1,465,383 | 8/1923 | Walsh et al. . | |
| 1,504,616 | 8/1924 | Gary . | |
| 1,734,826 | 11/1929 | Pick . | |
| 1,778,333 | 10/1930 | Neumann . | |
| 1,924,240 | 8/1933 | Harwell | 20/91 |
| 2,544,935 | 3/1951 | Orner | 144/309 |
| 2,572,772 | 10/1951 | Skoog | 154/116 |
| 2,870,803 | 1/1959 | Eppler | 143/54 |
| 2,878,844 | 3/1959 | Andersson | 144/309 |
| 2,942,635 | 6/1960 | Horne | 144/309 |
| 3,234,074 | 2/1966 | Bryant | 428/106 |
| 3,769,143 | 8/1973 | Kulesza | 161/156 |
| 3,969,558 | 7/1976 | Sadashige | 428/58 |
| 4,111,247 | 9/1978 | Hasenwinkle | 144/316 |
| 4,122,878 | 10/1978 | Kohn | 144/316 |
| 4,236,557 | 12/1980 | Marquardt | 144/315 R |
| 4,262,717 | 4/1981 | Kohn | 144/316 |
| 4,327,789 | 5/1982 | Reuter . | |
| 4,332,384 | 6/1982 | Hasegawa | 428/106 |
| 4,624,295 | 11/1986 | Howland | 144/347 |
| 4,784,887 | 11/1988 | Abendroth | 428/537.1 |

FOREIGN PATENT DOCUMENTS

| | | |
|---|---|---|
| 8183 | 7/1879 | Fed. Rep. of Germany . |
| 641101 | 1/1937 | Fed. Rep. of Germany . |
| 692987 | 6/1940 | Fed. Rep. of Germany . |
| 717552 | 2/1942 | Fed. Rep. of Germany . |
| 1628884 | 12/1971 | Fed. Rep. of Germany . |
| 49303 | 9/1931 | Norway . |
| 183513 | 7/1936 | Switzerland . |
| 781627 | 8/2957 | United Kingdom . |

*Primary Examiner*—George F. Lesmes
*Assistant Examiner*—J. Davis
*Attorney, Agent, or Firm*—Jensen & Puntigam

[57] ABSTRACT

The process begins with a single board, for instance a flat grain board, of selected dimensions. The single board may be clear or not or may be cut and rejoined to remove defects. The board is then sawn in a selected manner and the resulting boards are bonded together by gluing to form a remanufactured board, in such a manner that the glue lines are substantially invisible. In one preferred embodiment, a flat grain board is rip sawn and then edge glued to form a vertical grain board of selected dimensions.

2 Claims, 8 Drawing Sheets

PROCESS FOR RE-MANUFACTURING WOOD BOARD AND THE PRODUCT PRODUCED THEREBY

CROSS-REFERENCE TO RELATED APPLICATION

This is a continuation of application Ser. No. 210,735, filed on June 23, 1988, now abandoned.

TECHNICAL FIELD

This invention relates generally to the art of wood products and more particularly concerns a process for remanufacturing wood boards and the product produced thereby.

BACKGROUND ART

Clear vertical grain wood boards are highly desired among wood products consumers; unfortunately however, vertical grain boards can be made only from relatively large logs. For instance, a 1×12 vertical grain clear board requires a log which is approximately at least 30 inches in diameter. The dwindling supply of old growth large logs has resulted in a significant decrease in availability of vertical grain boards. Small logs, in fact, yield substantially no vertical grain boards at all, but rather only what is referred to as flat grain boards.

"Vertical grain" (VG) refers to those boards which are cut from the log in such a manner that the wide portion or face of the board, as opposed to its thickness portion, extends substantially perpendicularly to the direction of the annual growth rings or grain of the log, so that the rings form an angle of 45° or more with the surface of the board, while "flat grain" (FG) refers to those boards in which the wide portion of the board, as opposed to its thickness portion, extends substantially parallel with the annual growth rings or grain of the log, so that all or some of the rings form an angle of less than 45° with the surface of the board.

Vertical grain boards are more desirable for certain applications than flat grain boards because of several factors, including general appearance, a harder and smoother surface, and less tendency to warp. Vertical grain boards, especially clear boards, are particularly desirable for items such as doors, window and door frames, furniture, shelving, paneling and siding. The demand for such boards, even at high cost, continues to be large. Due to the increasing scarcity of large logs, which naturally results in an increasing scarcity of vertical grain boards, continuing increases in the price of such boards is expected, particularly as the cost of harvesting large logs in more remote locations increases.

As one solution to this problem, separate individual boards have in the past been edge glued together to form boards or panels of desired width. In some cases, there have been attempts to match the grain of the individual boards in order to provide a more natural appearance. However, even in those cases, it is quite noticeable that the resulting board has been produced by edge gluing two or more individual boards, i.e. the glue lines are quite distinct and the differences in the grain of the individual boards is quite distinct.

This process has been used with both vertical grain and flat grain boards. Although the glued-up or remanufactured board is as strong and as stable as a single board, and in many cases is more stable since certain types of stresses within individual boards may be compensated for by a particular arrangement of individual boards, there remains the high demand for boards having the appearance of a single board, particularly clear, vertical grain single boards. Current edge glued boards do not appear to satisfy that demand.

Another technique for producing wide vertical grain boards is to first face glue a plurality of separate, individual flat grain boards together, i.e. glue the wide dimension of individual flat grain boards together. The resulting combination is then rip sawn perpendicularly to the wide dimension (face) of the boards at successive intervals to form vertical grain boards. However, the glue lines of such vertical grain boards are clearly visible, and the composite nature of the boards is readily apparent. Further, the density of such boards will typically vary through the board.

DISCLOSURE OF THE INVENTION

The process and product of the present invention concerns the remanufacturing of a board. A single board is cut into a plurality of lengths. As an example, a flat grain board is rip sawn longitudinally into a plurality of longitudinal boards. The boards are then bonded together, such as by edge gluing, to form a remanufactured board. The remanufactured board has a uniform density throughout and the glue lines in the board, i.e. the boundary lines between adjacent boards, are substantially invisible, due to the close matching of color and grain across the remanufactured board.

BEST MODE FOR CARRYING OUT THE INVENTION

Figure 1:
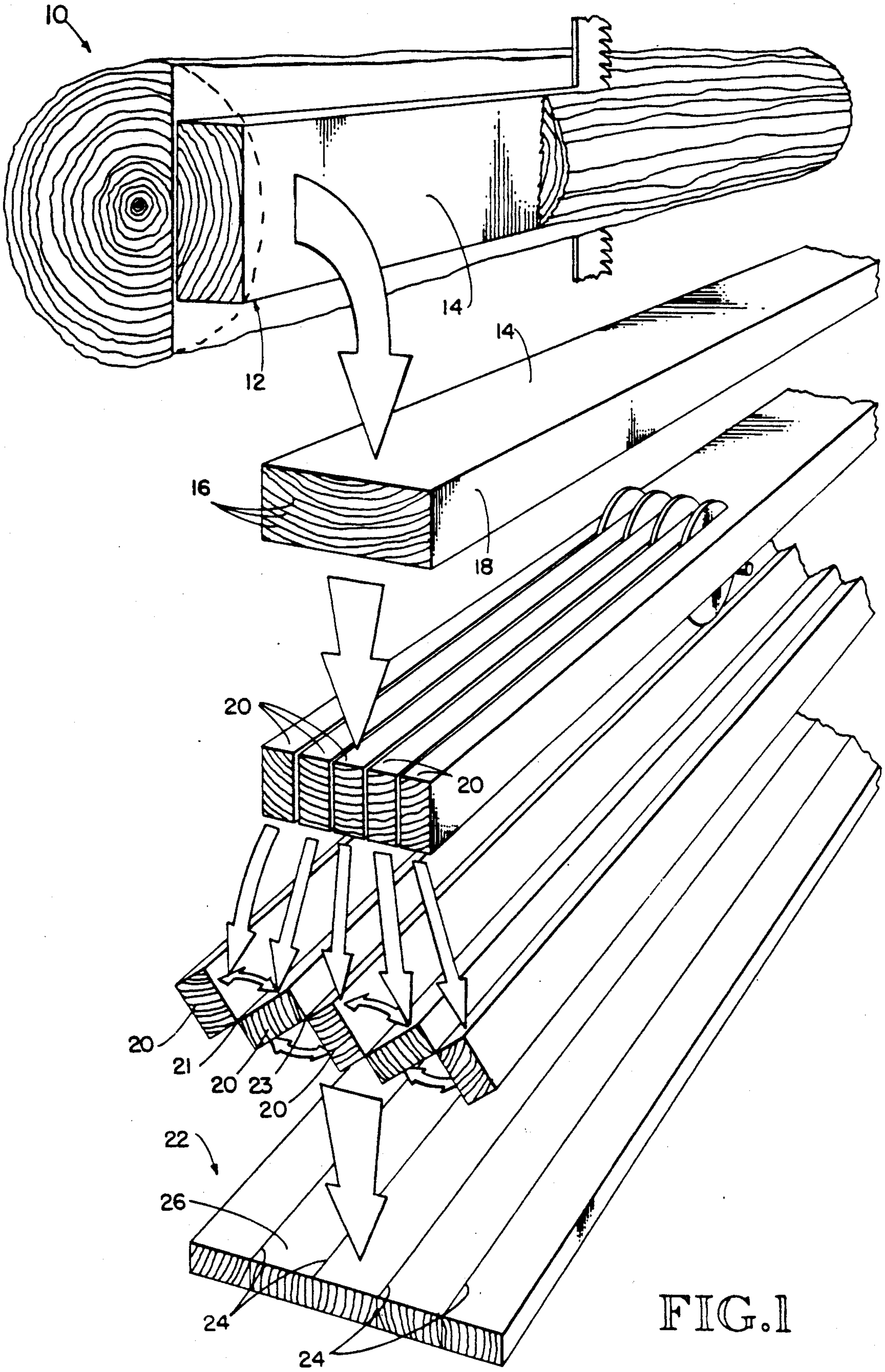
FIG. 1 shows a sequence of steps for one aspect of the present invention and the product produced thereby.

FIG. 1 shows a series of process steps resulting in a remanufactured vertical grain board, and is illustrative of one of the most important aspects of the present invention. There are, however, many variations and modifications of the process illustrated in FIG. 1, which in turn comprise other aspects of the invention. These modifications and variations are disclosed in more detail hereinafter.

FIG. 1 shows a conventional log 10, from which a flat grain board 12 is produced by conventional methods in a conventional saw mill. The board 12 shown in FIG. 1 is generally referred to as a side board. Although the dimensions of the side board 12 may vary, depending upon the size of the log 10, for purposes of illustration, the board is shown as a standard 2×6. The board 12 is a flat grain board, since its wide dimension or face 14 is approximately parallel with the growth rings or lines 16—16 in the board. The edge or thickness dimension 18 shows the vertical grain of the board since this dimension is approximately perpendicular to the growth rings 16—16. Although not specifically illustrated, it should be understood that the top and bottom surfaces of the board 12 are planed and otherwise conventionally finished, using conventional methods.

In the next step of the process of the present invention shown in FIG. 1, the flat grain side board 12 is rip sawn for its entire length. In FIG. 1, the board 12 is sawn into five boards 20—20, each one of equal thickness. However, the board 12 may be sawn into more or fewer boards, with different thicknesses, as disclosed in more detail hereinafter. In fact, there are several variations of this particular step disclosed below. It should also be noted, for clarification, that the term "rip sawn" herein refers to a longitudinal sawing of the board through the board from top to bottom when the board is oriented so that its wide or face dimensions are the top and bottom.

After the board 12 has been sawn into five separate boards 20—20, those boards are then each rotated 90 degrees and edge glued to form a remanufactured board 22. The basic edge gluing process is well known and is thus not explained in detail herein. The prior planing of the boards facilitates the edge gluing step. After the boards 20—20 have been edge glued, the resulting board 22 is sanded or planed to the finished product. The remanufactured board 22 is typically more stable and has at least equal strength as the original board 12. In the embodiment shown, adjacent ones of boards 20—20 are rotated away from each other about their common top and bottom edges 21, 23 alternately across the total number of boards 20—20, i.e. successive boards are rotated alternately clockwise and counterclockwise. While this is advantageous in certain situations, it should be understood that the individual boards may be rotated in a single direction, i.e. all clockwise or all counterclockwise, prior to the step of edge gluing. In many cases, a better overall "match" between adjacent boards 20—20 is achieved with single direction rotation. Generally, such edge matching is used to match grain variations across the board when the color is already substantially uniform, while alternate direction rotation is used to produce color matching across the board. Also, of course, it should be understood that the invention is not limited to either edge matching technique specifically; rather, the boards 20—20 may be arranged in various ways relative to each other prior to the step of edge gluing.

The result of the process of FIG. 1, in which a single board is first rip sawn and then edge glued, is a remanufactured board 22 in which the glue lines 24—24 are substantially invisible, giving the appearance of a single board. The boundaries between adjacent boards and hence the boundaries across the entire board are in effect substantially hidden or masked. The density of the board is also substantially uniform throughout the board. Since the boards 20—20 have been rotated and edge glued, the wide or face dimension 26 of board 22 is vertical grain. Thus, the remanufactured board 22 is a vertical grain board.

It is quite difficult to distinguish the remanufactured board 22 from a solid sawn vertical grain board, even when stained or otherwise finished to highlight the grain. This is so because the process begins with a single board. The glue lines in the board are substantially invisible because each board 20 shares the same color, the same ring spacing and the same grain angle as its adjacent or neighbor board 20 in the remanufactured board 22. The width of the board 22 depends upon the dimensions of the original board 12 and the number of boards 20—20 rip sawn therefrom, as well as other variables which will be discussed in more detail in the following paragraphs.

Although the boards 20—20 are disclosed to be glued together, using known glues, it should be understood that the invention includes various gluing techniques as well as other bonding techniques, including techniques designed to create a molecular bond between two adjacent pieces of wood. This applies to the variations discussed below as well.

Figure 2:
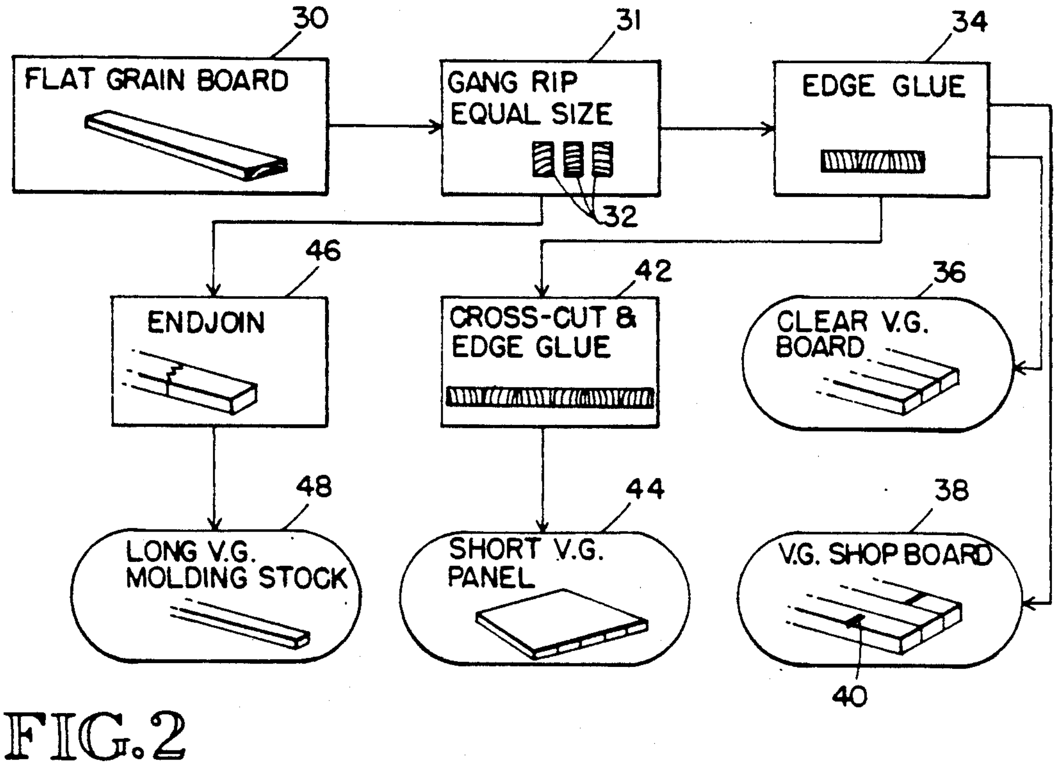
FIG. 2 is a flow chart showing a sequence of process steps and the resulting products for another aspect of the present invention.

FIG. 2 shows some variations of the concept of FIG. 1. In FIG. 2, the process begins with a flat grain board 30. As indicated above, board 30 can be of various dimensions. The board 30 is first rip sawn in step 31 into a plurality of boards of equal size 32—32. These boards can be edge glued at 34 to produce either a clear vertical grain board 36, as described above in detail with respect to FIG. 1, or what is referred to as a vertical grain shop board 38, which has imperfections, such as a knot or the like 40, in one or more surfaces thereof. In one variation, the edge glued board at 34 can be crosscut sawn into two or more pieces, typically of equal length, and then those resulting boards can be edge glued at 42 to produce a vertical grain board which is typically sufficiently wide to be classified as a panel 44.

Alternatively, the boards 32—32 can be joined end-to-end by any one of various known end joining techniques. As an example, the ends of two boards 32—32 may be joined by a finger joining technique at 46 to produce a long, narrow vertical grain board generally referred to as molding stock 48. Typical dimensions of molding stock vary from $\frac{3}{8}$ inch×$\frac{3}{4}$ inch to 2 inch×3 inch.

The finger joining technique mentioned above is well known in the art, and comprises first making a zig zag or sawtooth cut in the ends of the two boards which are to be joined. The two sawtoothed ends are then joined, again by well-known, conventional gluing techniques to form a single board. The finger joint in the resulting board shown is significantly obscured by the closely matched grain due to the use of a single board 30 from which the individual boards 32—32 are produced. Another well known example of an end joining technique is referred to as scarf joining which uses an angled cut and which may in some cases produce a less visible glue line.

All of the resulting products shown in FIG. 2, i.e. clear vertical grain board 36, vertical grain shop board 38, vertical grain panel 44, and vertical grain molding stock 48 are characterized by substantially invisible glue lines and substantially uniform density and hence the appearance of a single vertical grain piece of wood, due to the fact that the resulting boards are remanufactured from a single original board 30.

Figure 3:
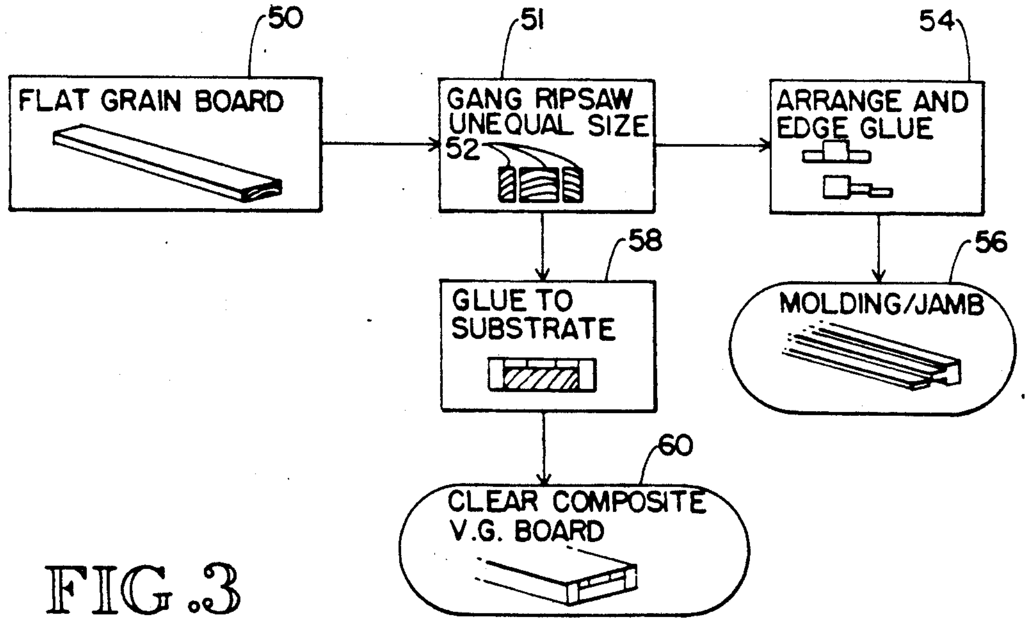
FIG. 3 is a flow chart showing a sequence of process steps and the resulting products for a further aspect of the present invention.

FIG. 3 shows the application of the concept of the present invention to produce a wood product of special configuration, i.e. special moldings such as jambs and the like. Referring to FIG. 3, the process begins with a flat grain board 50 of selected dimensions. The flat grain board 50 is then rip sawn in step 51 into boards 52—52 of selected unequal size. Boards 52—52 are then glued together at 54 in selected arrangements to produce a particular door jamb configuration, such as for instance, that shown at 56. The actual molding or door jamb product 56 has a configuration which depends upon the size of the boards 52—52 sawn from board 50.

Alternatively, boards 52—52 may be glued in a selected arrangement to a substrate 58. This produces a composite board shown generally at 60. In the embodiment shown, the resulting composite board has three solid wood sides, one of which is vertical grain; one side is the composite. However, it is equally possible to completely surround the substrate 48 with boards 52—52 so that the vertical grain boards are on all sides of the substrate 58. The composite board 60 is advantageous in certain situations, because relatively thick and wide vertical grain boards can be manufactured from relatively thin vertical grain boards, depending upon the size of the substrate. Further, the arrangement of the solid boards in step 58 may be used alone, without the substrate, in selected circumstances.

Figure 4:
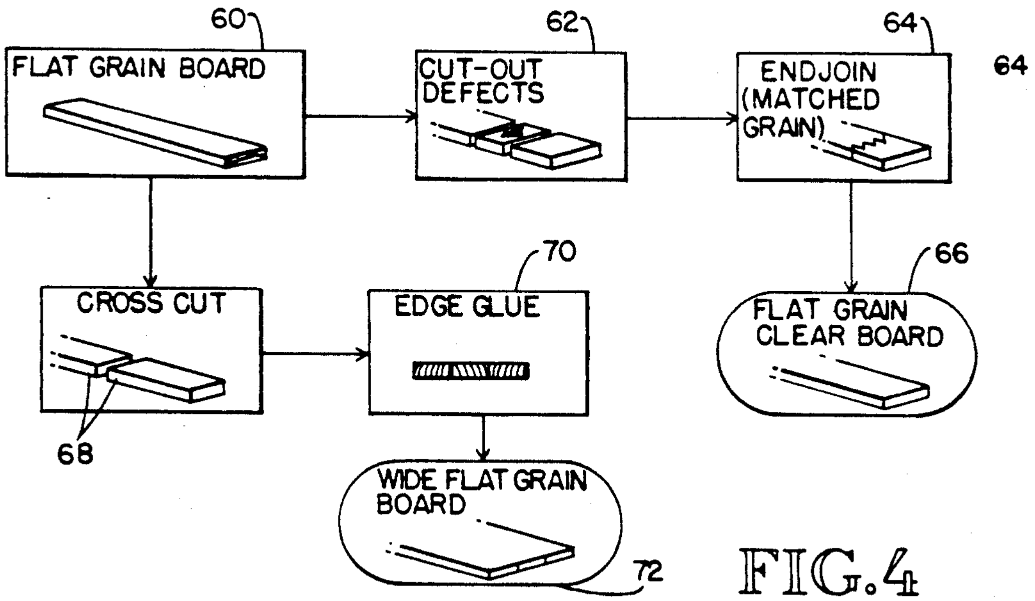
FIG. 4 is a flow chart showing a sequence of process steps and the resulting products for another aspect of the present invention.

FIG. 4 shows further variations of the process of the present invention, again beginning with a flat grain board 60 of selected dimensions. In one variation, the flat grain board 60, instead of being a clear board, has defects, such as knots, therein. In the process shown in FIG. 4, the knots are cut-out at 62, by cross-cut sawing, for instance. This results in a plurality of clear boards. The cut-out portions are used for wood chips or other similar product, and the boards are then end joined at 64 to produce a clear flat grain board 66. The clear flat grain board 66 may then be used to produce the vertical grain products described above and hereinafter. The end joints of the flat grain board 66 are significantly obscured, i.e. substantially invisible, due to the matching of the grain because the process begins with a single board.

In another variation, still referring to FIG. 4, the flat grain board 60 is first cross-cut sawn at selected intervals, forming a plurality of boards 68. These boards are then edge glued at 70 to produce a wider flat grain board 72. In edge gluing to produce the remanufactured board 72, the plurality of boards 68—68 can be individually moved up along side of each other and glued in that manner, or they can be turned end for end and then edge glued. This later step produces a board with more stability, and via the pressure of the edge gluing techniques, can eliminate bow and crook variations in original board 60.

Further, the board 60 may be cross-cut into at least three sections, with the middle board then being turned upside down prior to edge gluing. Again, such a step increases the overall stability of the resulting remanufactured board, as well as improving the appearance of the product by better grain matching. The above-described selected orientation of boards prior to edge gluing can of course be done with respect to other variations described herein as well.

Lastly, the resulting edge-glued board 72 can be resawn, which refers to a longitudinal sawing of a board, edge-to-edge, i.e. perpendicular to a rip sawing of the board. The two or more boards resulting from the rip sawing process can then be used separately, or they can be edge glued to form an even wider flat grain board, i.e. a panel.

Figure 5A:
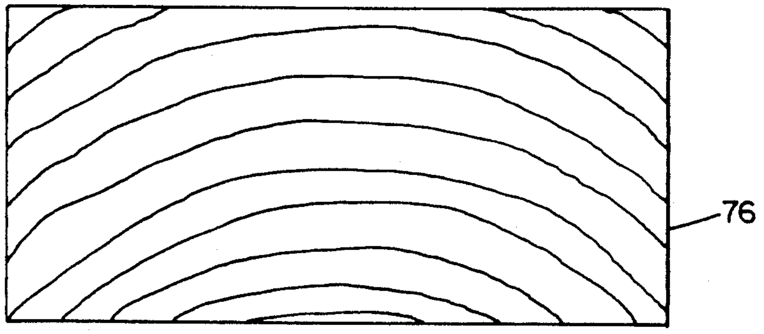
FIGS. 5A-5D show a sequence of process steps for making a solid door jamb.
Figure 5B:
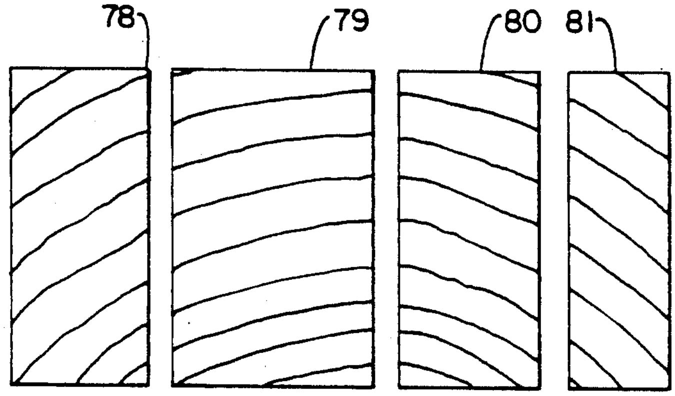
Figure 5C:
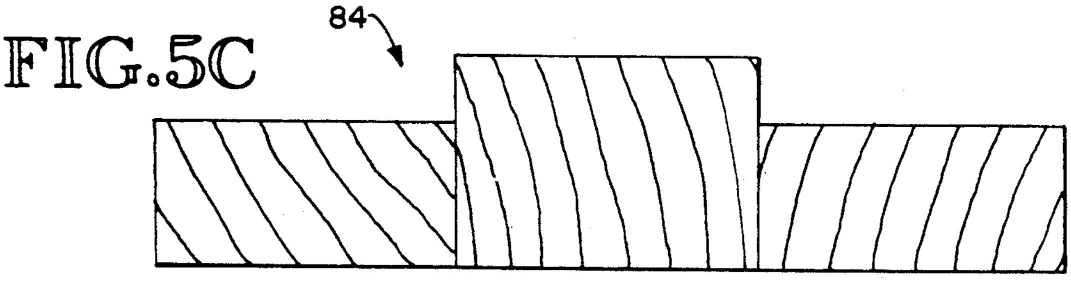

FIGS. 5A-5D show a detailed sequence of steps to produce a vertical grain solid door jamb. An initial flat grain 2×4 board is shown at 76 in FIG. 5A. In FIG. 5B, the flat grain board 76 is rip sawn into four boards 78-81, with boards 78 and 80 having substantially the same thickness, but thinner than board 79. Board 81 is a by-product. Board 81 will not be present if the initial board 76 is not as wide as that described above. Boards 78-80 in FIG. 5B are used to form the solid door jamb. Each board is rotated 90° such that the middle board 79, which is of greatest thickness, is between boards 78 and 80. The three boards 78-80 are then edge glued as shown in FIG. 5C to form a remanufactured board 84. The remanufactured board 84 is then molded and otherwise finished in conventional fashion to produce a door jamb 86, shown in FIG. 5D. The door jamb 86 is vertical grain, and also appears to be a unitary board since the glue lines 88—88 are substantially invisible because the three boards 78-80 were cut from a single original board 76.

Figure 5D:
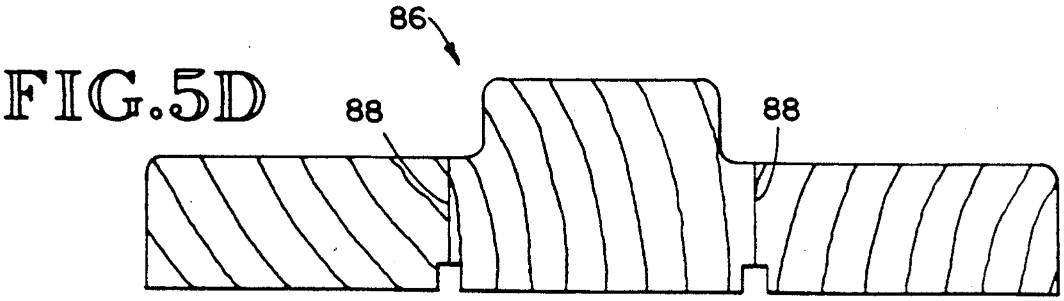
Figure 6A:
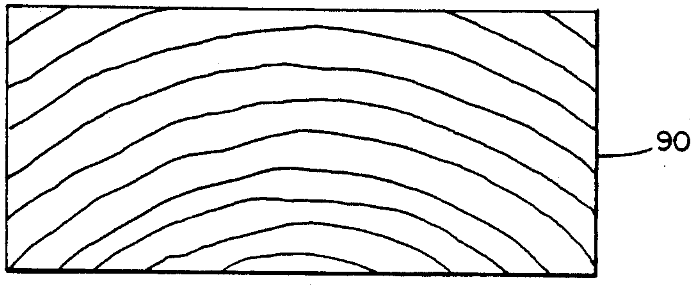
FIGS. 6A-6E show a sequence of process steps for making a split door jamb.
Figure 6B:
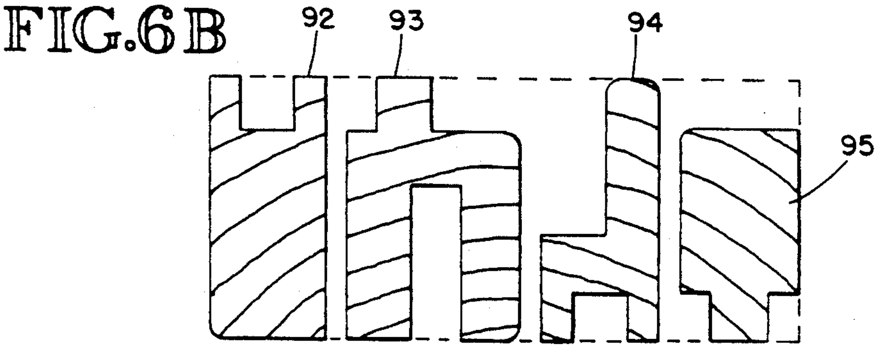
Figure 6C:
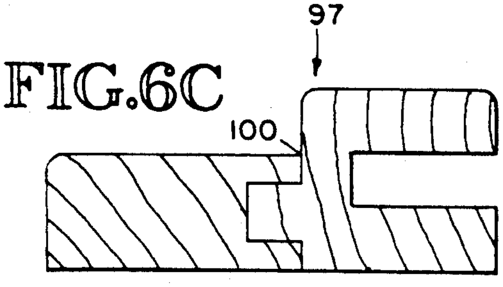
Figure 6D:
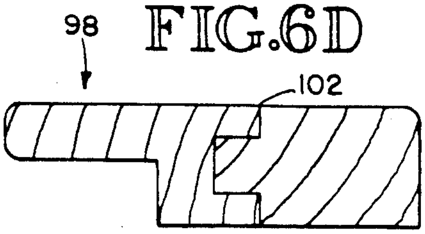
Figure 6E:
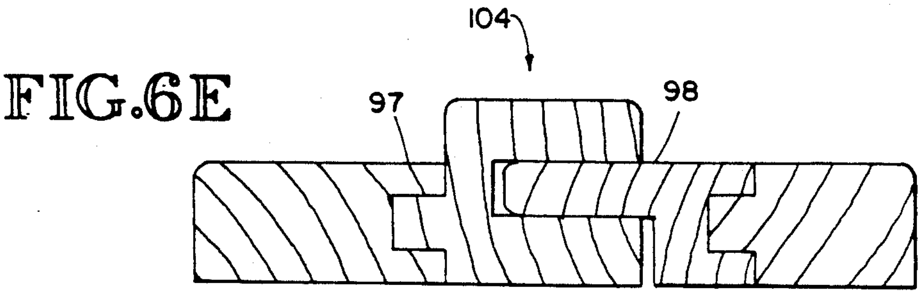

The specific configuration shown in FIG. 5D is illustrative of different types of moldings, door jambs and the like which have a fairly complex shape and which can be remanufactured using the process of the present invention.

FIGS. 6A-6E show the remanufacturing of an even more complex molding, i.e. a split door jamb comprising two separate pieces which are selectively positioned in actual use in accordance with the thickness of the wall. A flat grain 2×4 board 90 is the starting point for the process. From this flat grain board, four boards of particular cross-sectional configuration 92-95 are produced through a combination of conventional sawing and molding techniques. The configuration and relative arrangement of the boards 92-95 within the cross-sectional dimensions of the board 90 result in those boards being vertical grain when positioned in selected proper orientation for the final split jamb product.

Boards 92 and 93 are joined together, as shown, as are boards 94 and 95. The resulting remanufactured boards 97 and 98, respectively, again appear to be vertical grain single boards, due to the substantial invisibility of the glue lines, i.e. line 100 in FIG. 6C and line 102 in FIG. 6D. These two products are then installed to form a final product 104. The relative arrangement of boards 97 and 98 is dependent on the thickness of the jamb wall. The fact that the remanufactured boards 97 and 98 are vertical grain clear boards significantly enhances the appearance of the final product 104. The adjustable jamb 104 will in effect appear to be a unitary board after installation, because all the pieces originated from the same original board 90.

Figure 7:
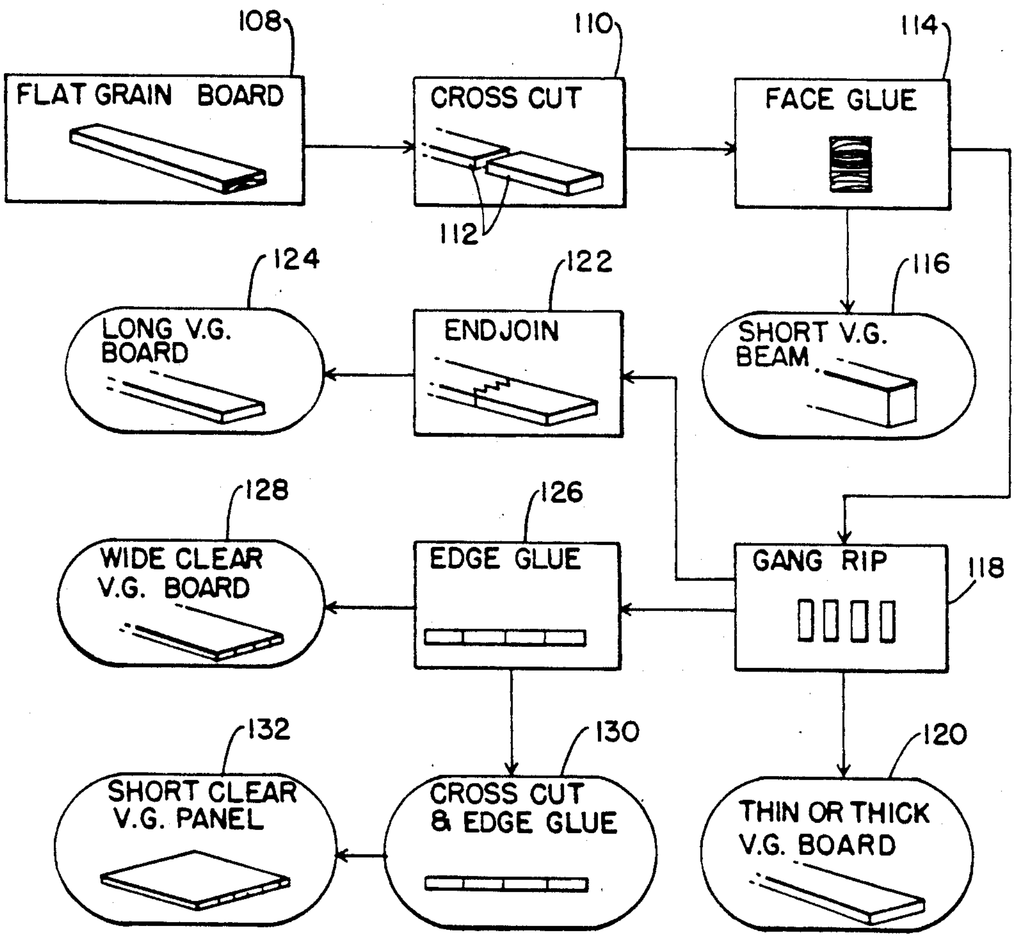
FIG. 7 is a flow chart showing a sequence of process steps and the resulting products for a further aspect of the present invention.

FIG. 7 shows a further aspect of the present invention, beginning with a flat grain board 108 of selected dimensions. The flat grain board is first cross-cut at 110 to produce a plurality of flat grain boards 112—112 which are then face glued at 114 to product a vertical grain beam 116. The face glued board 114 may be then rip sawn at 118 to form a plurality of thin or thick vertical grain boards 120—120. The rip sawn boards 118 may also be end joined, such as by finger joining, at 122 to form a long vertical grain board 124, or the rip sawn boards 118 may be edge glued at 126 to form a wide, clear vertical grain board 128. The edge glued boards at 126 may in another variation be cross-cut and edge glued at 130 to form a short, clear, vertical grain panel 132.

Figure 8:
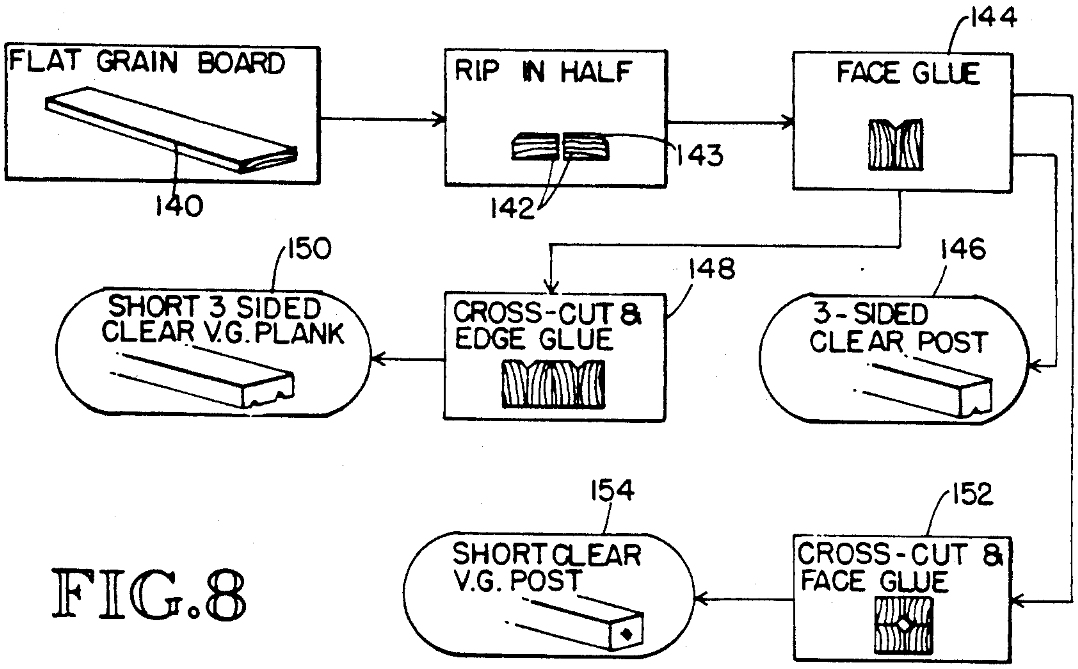
FIG. 8 is a flow chart showing a sequence of process steps and the resulting products for a still further aspect of the present invention.

FIG. 8 shows the use of the process of the present invention to produce a post or beam from an original flat grain board 140. In this variation, a single original flat grain board 140 is first ripped in half to form two boards 142—142. As an illustration, but not necessarily, the respective upper outer edges of the two boards 142 have wane 143, i.e. a defect in which a portion of the edge of the board is missing. The boards 142—142 are then face glued at 144, resulting in a post 146 having a defect in the middle of one side thereof, but otherwise clear (three sides).

Further, the face glued board 144 may be cross-cut and then again edge glued at 148 to produce a short, clear vertical grain plank 150 having perhaps a defect or defects in one face thereof, as shown. Still further, the face glued post 144 could be cross-cut and then face glued at 152, with the defects in each cross-cut piece facing each other, so that the resulting product is a short, clear vertical grain post 154 with a center defect which is hidden.

Alternatively, a very wide beam could be formed by face gluing a plurality of posts 146 together, or a plurality, i.e. 4, of cross-cut flat grain boards from the same original board 140 could be face glued together and then rip sawn and then again face glued to produce a very wide remanufactured beam.

Figure 9:
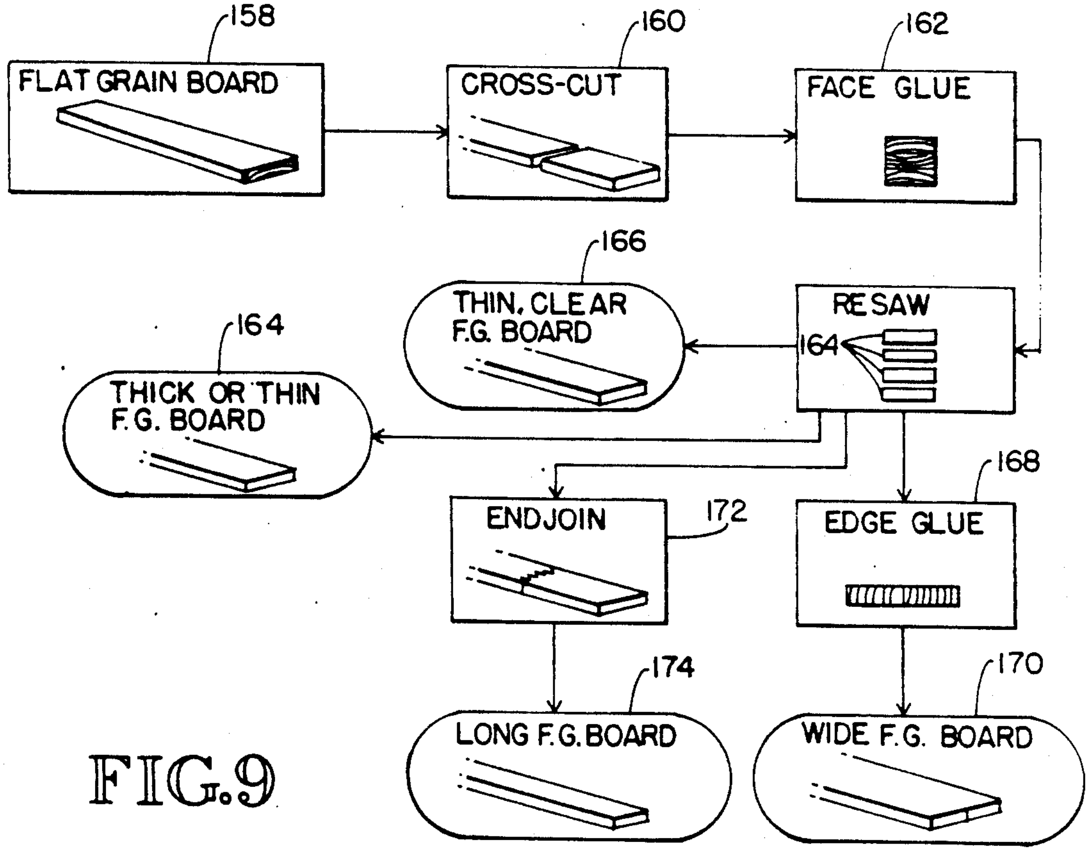
FIG. 9 is a flow chart showing a sequence of process steps and the resulting products for yet another aspect of the present invention.

FIG. 9 shows still another variation of the present invention, beginning with a flat grain board 158 of selected dimensions. The board 158 is first cross-cut at 160 into 2 or more pieces, which are then face glued at 162. The resulting product is then resawn, parallel to the glue line planes, to produce flat grain boards 164—164, of selected thickness, perhaps having defects in one side thereof, or a clear flat grain board 166, depending upon the defects in the original flat grain board 158. The resawn boards 164—164 may be also edge glued at 168 to produce a wide flat grain board 170, or may be end joined at 172 to form a long, flat grain board 174.

Although the respective end products of the variations shown in FIG. 9 are flat grain, those products have been redimensioned into desirable dimensions from a single original flat grain board 158. The resulting products further have a good appearance, because the resulting glue lines are substantially invisible, due to the matching of the grain which occurs because the remanufactured boards are all produced from an original single flat grain board 158.

Figure 10:
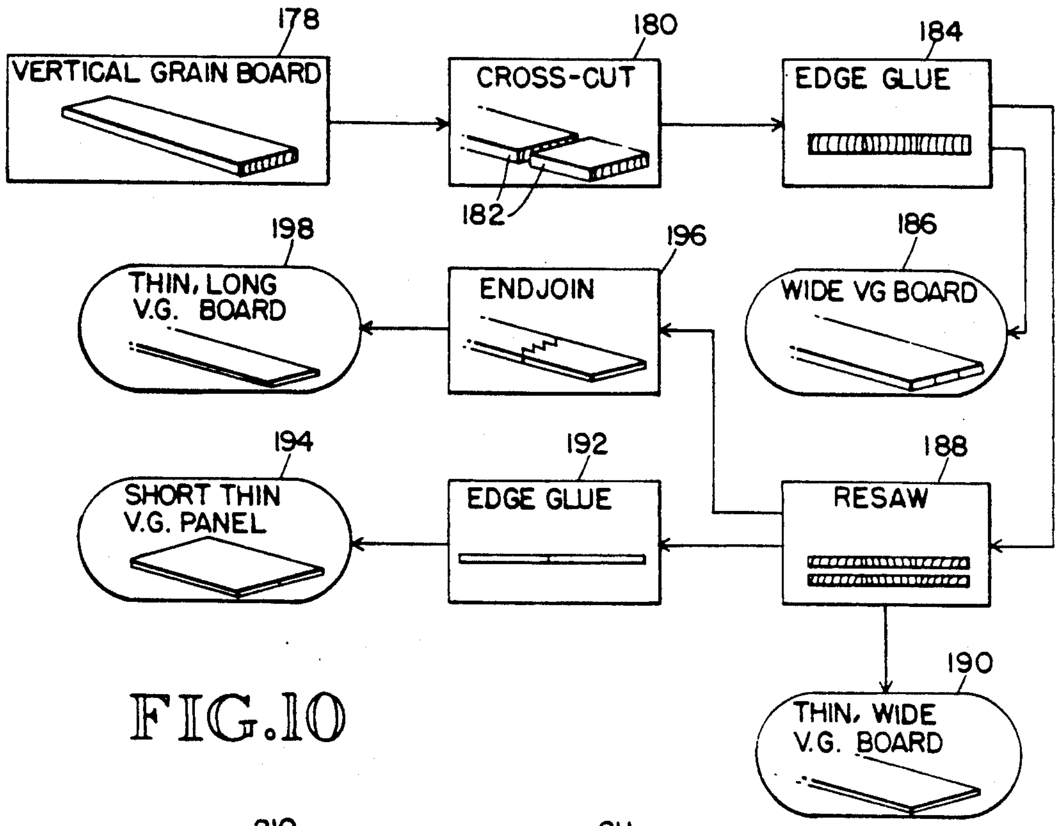
FIG. 10 is a flow chart showing a sequence of process steps and the resulting products for a still further aspect of the present invention.

FIGS. 10-13 shows various processes in which the final product is a vertical grain board and the initial board is also a vertical grain board. In FIG. 10, for instance, the original vertical grain board 178 is cross-cut sawn at 180 into a plurality of boards 182—182. The boards 182—182 are then edge glued at 184 to produce a wide vertical grain board 186.

In a variation, the wide vertical grain board at 184 in FIG. 10 can be resawn at 188 to produce a thin wide vertical grain board 190. The resawn boards at 188 can also be edge glued at 192 to produce a short, thin vertical grain panel 194. Alternatively, the thin, wide vertical grain boards 188 can be finger joined end-to-end at 196 to produce a thin long vertical grain board 198. The products shown in FIG. 10 thus are redimensioned relative to the original board 178. Any of the resulting boards appear to be a single unitary vertical grain board, due to the substantial invisibility of the glue lines, because each remanufactured board is made from an original single board 178.

Figure 13:
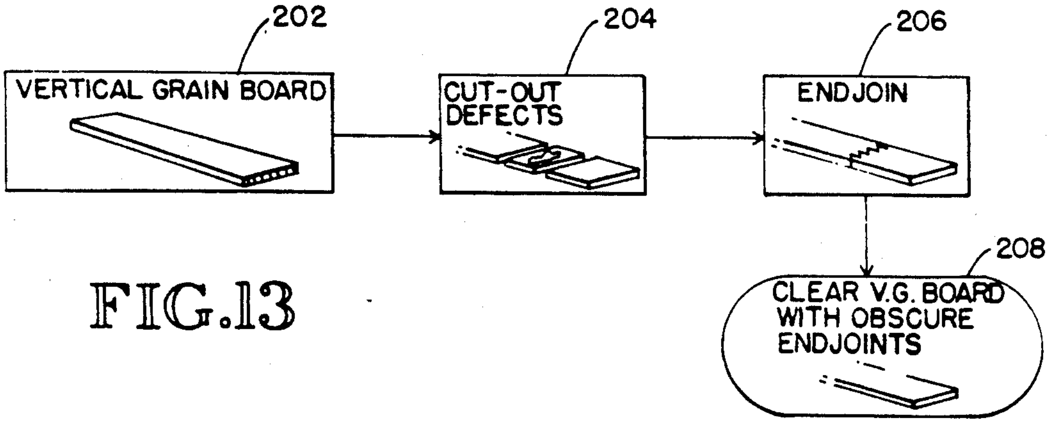
FIG. 13 is a flow chart showing a sequence of process steps and the resulting products for a still further aspect of the present invention.

Referring now to FIG. 13, any one of the processes described involving an original vertical grain board 202 can include the step of cutting out a defect at 204 and then end joining the remaining boards at 206 to produce a clear vertical grain board 208, having obscure or substantially invisible finger joints. As discussed above, any of several known end joining techniques can be used, including vertical finger joining, horizontal finger joining, scarf joining and others. Any of the above and hereinafter described processes can begin with a clear board, after the defects have been removed through cutting and end joining.

Figure 11:
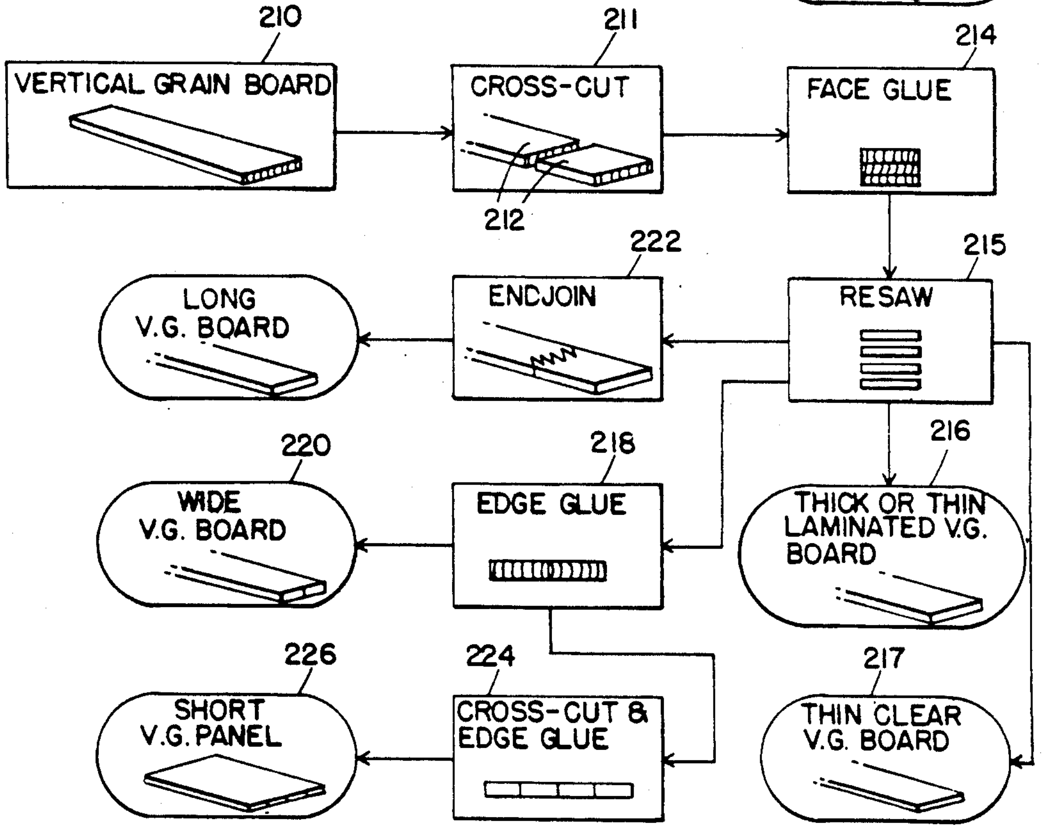
FIG. 11 is a flow chart showing a sequence of process steps and the resulting products for a further aspect of the present invention.

The process and products illustrated in FIG. 11 start with a vertical grain board 210. Board 210 is in one variation cross-cut at 211 into a plurality of boards 212—212 and then face glued at 214. The resulting face glued product is then resawn at 215 to produce thin clear vertical grain boards 217 as well as thick and/or thin vertical grain boards 216. One or more of the vertical grain boards 216 will have a lateral glue line depending upon the number of boards face glued in step 214. The resawn vertical grain boards from step 214 may be edge glued at 218 to form a wide, vertical grain board 220, or the resawn boards may be end joined at 222 to form a long, vertical grain board. The edge glued board 218 may also be cross-cut and then edge glued at 224 to form a short vertical grain panel 226.

The resawing step 215 in FIG. 11 for original vertical grain boards and also the resawing step in FIG. 9 for original flat grain boards, provides a possibility for partially or completely hiding knots or similar disfigurements appearing on one or more sides of the original board. With face glued boards, different resawing patterns may be used to minimize the appearance of knots in the resulting boards. For instance, a clear board may be placed in the middle between two boards having knots on both sides. All three boards are from a single original board. By resawing with a relatively narrow middle board, at least one surface of the two outer boards is also clear, thereby increasing the value of those boards substantially. Knots along the edges may be hidden by edge gluing techniques. Further, again using a clear piece from a single original board in the middle, two very narrow center boards can be produced, which then can be glued to the back sides of the two outer boards, thereby producing a total of two boards which are clear on both sides. Other variations are possible, depending upon the knot configurations of the original board.

More generally, any defects in the boards sawn from a single original board may be placed in an optimal position relative to the other boards forming the remanufactured board, prior to the step of gluing, which may be either edge gluing or face gluing in accordance with the particular requirements or standards of the end product. As an example, in some end products it is more desirable to have defects toward the edges of the product while in others, any defects should be toward the center. The boards making up the remanufactured product may be arranged so as to accomplish the particular desired defect location.

Figure 12:
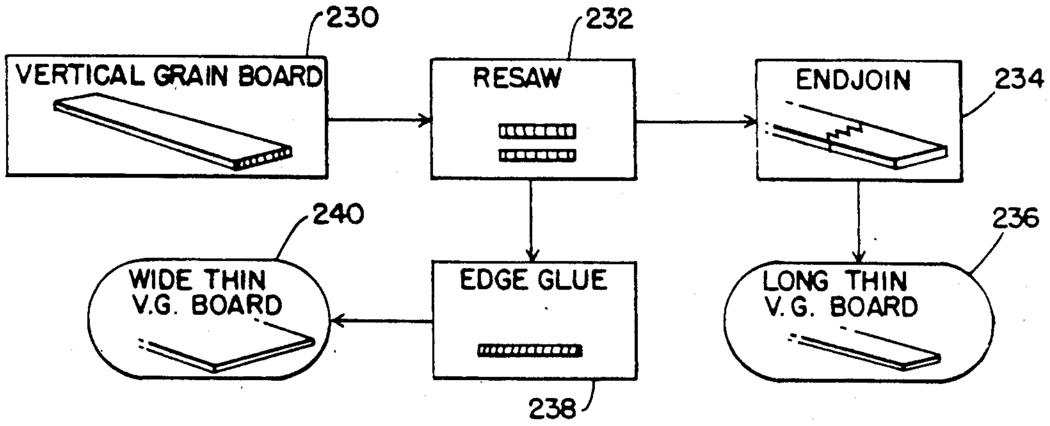
FIG. 12 is a flow chart showing a sequence of process steps and the resulting products for yet another aspect of the present invention.

FIG. 12 shows the steps in another variation, in which a vertical grain board 230 is initially resawn at 232, with the resulting resawn boards being end joined at 234 to form a long, thin vertical grain board 236. Alternatively, the resawn boards from step 232 can be edge glued at 238 to form a wide, thin vertical grain board 240.

Thus, a number of different variations and modifications of the basic concept of the present invention have been disclosed, beginning either with a flat grain board or a vertical grain board. Basically, a single board is sawn in various ways to produce remanufactured boards having selected dimensions. The resulting remanufactured boards all look like original unitary boards, due to the glue lines being substantially invisible, because the remanufactured boards are all made from an original single board.

As disclosed in detail above, various combinations of boards sawn from the original board may be used to form different size boards of varying thickness and width. A variety of different boards can be individually processed in selected ways to produce a resulting board or boards of selected dimensions, or a given board can be processed to produce a variety of other boards. In all cases, however, the starting point is a single individual board.

There is the possibility of manufacturing panel size combinations as well. Further, special molding configurations can be produced. Still further, conventional finger joining and other end-joining techniques can be used to extend the length of boards. Also, special or conventional molding techniques can be used for the ends of boards, i.e. the boards can be put through a molder, and then joined end-to-end in a mortise and tenon like configuration, or the edges of the boards could be molded to form a tongue and groove like arrangement.

There are other possible advantages to the invention which may not be readily apparent. Currently, decisions relative to the manner in which a particular log is to be cut are made when the log is ready to be sawn at the mill. If the log appears to be a good candidate for appearance grade (clear) lumber, the log is sawn one way; otherwise the log is sawn so as to maximize the amount of so-called dimension grade lumber, which typically is not clear and thus is less expensive and hence less profitable. Not infrequently, however, some clear lumber is produced from "dimension" logs and some logs which are selected for appearance grade lumber are discovered to have substantial imperfections when they are opened up.

With the present invention, the decision concerning how to saw a log becomes less important, as all logs can be sawn initially to produce boards of selected dimensions, with maximum output from a given log. The clear boards from each log are selected after this initial sawing. The clear boards can then be used to produce the remanufactured boards described herein of selected dimensions. Thus, the profitability of a given log is maximized, because the clear portion of each log is used to its potential, i.e. the true quality of the lumber in the log is determined after the primary breakdown (initial sawing) of the log has occurred.

It should be understood that other changes, modifications and substitutions may be incorporated in such embodiments disclosed herein without departing from the spirit of the invention which is defined by the claims which follow.

I claim:

1. A remanufactured composite vertical grain board, comprising:
- a substrate; and
- a plurality of flat grain subboards, at least two of which are of unequal size, which have been ripsawn from a single original flat grain board and then rotated and edge bonded together and glued around a portion of the substrate, wherein any glue lines between the subboards are substantially invisible.

2. An article of claim 1, wherein said portion of the substrate includes at least three sides thereof.

* * * * *